(12) United States Patent
Mizushima

(10) Patent No.: US 12,366,720 B2
(45) Date of Patent: Jul. 22, 2025

(54) LENS BARREL

(71) Applicant: CANON KABUSHIKI KAISHA, Tokyo (JP)

(72) Inventor: Masayasu Mizushima, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 642 days.

(21) Appl. No.: 17/688,997

(22) Filed: Mar. 8, 2022

(65) Prior Publication Data

US 2022/0291479 A1    Sep. 15, 2022

(30) Foreign Application Priority Data

Mar. 10, 2021 (JP) .................................. 2021-038646

(51) Int. Cl.
*G02B 7/14* (2021.01)
*G02B 27/64* (2006.01)

(52) U.S. Cl.
CPC .............. *G02B 7/14* (2013.01); *G02B 27/646* (2013.01)

(58) Field of Classification Search
CPC .................................. G02B 7/14; G02B 27/646
See application file for complete search history.

(56) References Cited

U.S. PATENT DOCUMENTS

| | | | | |
|---|---|---|---|---|
| 8,983,284 | B2 * | 3/2015 | Ishimasa | G02B 27/646 396/55 |
| 9,575,329 | B2 * | 2/2017 | Kim | H04N 23/55 |
| 9,857,555 | B2 * | 1/2018 | Lee | G02B 27/646 |
| 10,983,362 | B2 * | 4/2021 | Minamisawa | G02B 27/646 |
| 11,974,043 | B2 * | 4/2024 | Suwa | H04N 23/687 |
| 2020/0007725 | A1 | 1/2020 | Nakamura | |

FOREIGN PATENT DOCUMENTS

| | | | | |
|---|---|---|---|---|
| CN | 1881008 | A * | 12/2006 | ........... G02B 27/646 |
| CN | 109683428 | A * | 4/2019 | ............... G03B 5/00 |
| JP | 2004077919 | A | 3/2004 | |
| JP | 2011249380 | A | 12/2011 | |
| JP | 5053754 | B2 | 10/2012 | |
| JP | 2013003178 | A | 1/2013 | |
| JP | 2016200740 | A | 12/2016 | |
| JP | 2018120019 | A | 8/2018 | |
| JP | 2020144278 | A * | 9/2020 | ........... G02B 15/146 |
| JP | 2021036256 | A | 3/2021 | |
| KR | 102022800 | B1 * | 9/2019 | |

\* cited by examiner

*Primary Examiner* — Christopher Stanford
(74) *Attorney, Agent, or Firm* — ROSSI, KIMMS & McDOWELL LLP

(57) ABSTRACT

A lens barrel includes an electric contact fixed to a mount, a first substrate disposed between a fixed barrel and the mount, a second substrate connected to the first substrate and the electric contact while forming a folded portion, and disposed so as to overlap the first substrate when viewed from an optical axis direction, a plurality of first elastic members held by the fixed barrel and configured to position and hold the first substrate in a direction orthogonal to an optical axis, and a second elastic member held by the fixed barrel and disposed between the fixed barrel and the first substrate. The first substrate is urged toward the fixed barrel in the optical axis direction by a force from the folded portion, and contacts the second elastic member on a surface on a side of the fixed barrel of the first substrate.

10 Claims, 6 Drawing Sheets

LENS BARREL

BACKGROUND OF THE INVENTION

Field of the Invention

The present invention relates to a lens barrel (lens apparatus).

Description of the Related Art

In the conventional lens barrel of an interchangeable lens system that can provide an image stabilization, a substrate mounted with a shake detector that detects a shake is positioned and fixed near a mount as an attachment unit for a camera body. Japanese Patent No. 5053754 discloses a lens barrel that holds a substrate by an elastic member in order to restrain a shutter shock shake generated when a shutter mechanism in the camera body is driven from transmitting to the shake detector. Japanese Patent Laid-Open No. 2004-77919 discloses a lens barrel that presses and holds the substrate against the mount side by an urging rubber provided between a fixed portion and the substrate.

The lens barrel disclosed in Japanese Patent No. 5053754 holds the substrate by at least three elastic members and thus needs three holes or notches used to engage the elastic members, but cannot provide electrical wires or mount electrical components around the holes, notches, or their peripheries. Therefore, the space use efficiency is not high, and it is difficult to make smaller the lens barrel.

Moreover, in the lens barrel disclosed in JP 2004-77919, the shake is directly transmitted to the substrate via the mount, and deteriorates the image stabilizing performance.

SUMMARY OF THE INVENTION

The present invention provides a lens barrel that has a high space use efficiency and can suppress a transmission of a shake to a shake detector.

A lens barrel according to one aspect of the present invention includes a fixed barrel, a mount attached to the fixed barrel, an electric contact fixed to the mount, a first substrate disposed between the fixed barrel and the mount, a second substrate connected to the first substrate and the electric contact while forming a folded portion, and disposed so as to overlap the first substrate when viewed from an optical axis direction, a plurality of first elastic members held by the fixed barrel and configured to position and hold the first substrate in a direction orthogonal to an optical axis, and a second elastic member held by the fixed barrel and disposed between the fixed barrel and the first substrate. The first substrate is urged toward the fixed barrel in the optical axis direction by a force from the folded portion, and contacts the second elastic member on a surface on a side of the fixed barrel of the first substrate.

Further features of the present invention will become apparent from the following description of exemplary embodiments with reference to the attached drawings.

DESCRIPTION OF THE EMBODIMENTS

Figure 1:
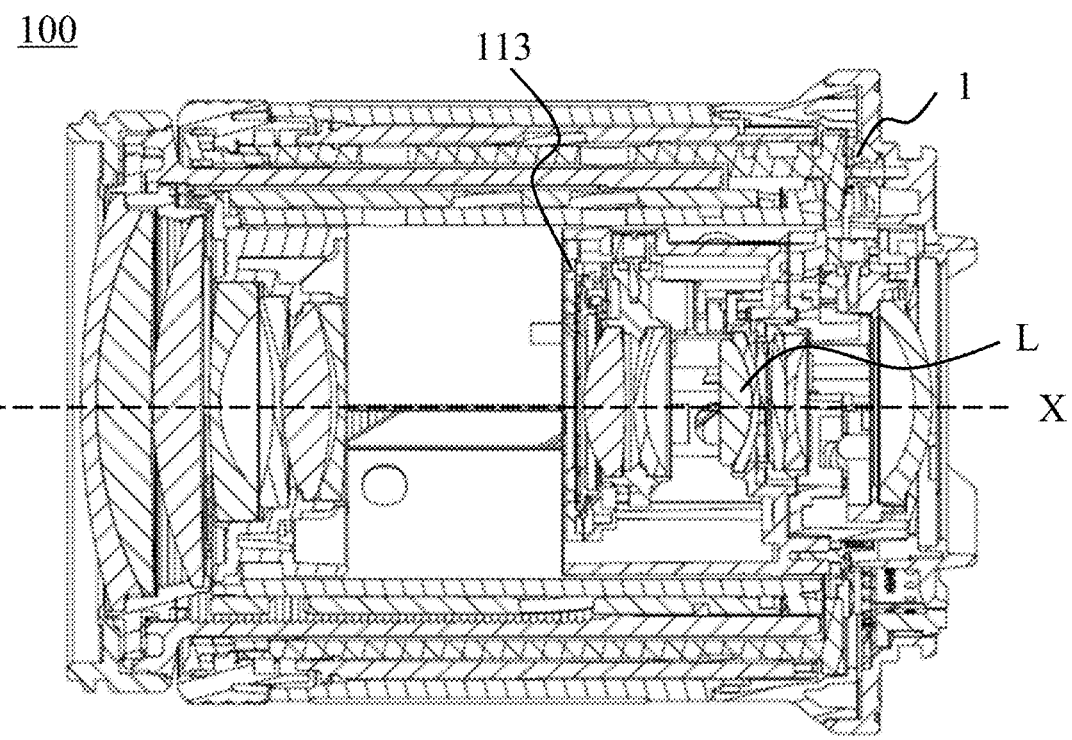
FIG. 1 is a sectional view of a lens barrel according to one embodiment of the present invention.

Referring now to the accompanying drawings, a detailed description will be given of embodiments according to the present invention. Corresponding elements in respective figures will be designated by the same reference numerals, and a duplicate description thereof will be omitted.

FIG. 1 is a sectional view of a lens barrel (interchangeable lens) 100 according to one embodiment of the present invention. The lens barrel 100 is attachable to and detachable from a camera body (not shown) such as a single-lens reflex camera, a mirrorless camera (nonreflex camera), or a film-based camera.

The lens barrel 100 includes a plurality of lens units. An image stabilization lens unit L is moved in a direction including a component of a direction orthogonal to an optical axis X of the lens barrel 100 during the image stabilization. The lens barrel 100 may have a structure such as a focus mechanism, a zoom mechanism, and an electric diaphragm mechanism. An electric-component mounted board (first substrate) 1 is an annular printed substrate mounted with a control circuit and a shake detector for detecting a blur, and controls various actuators and an electromagnetic diaphragm 113. More specifically, the shake detector includes a gyro sensor or an acceleration sensor. The electric-component mounted board 1 may have a C-type shape connected at least 180° or more (such as about 240°) in the circumferential direction.

Figures 2A, 2B:
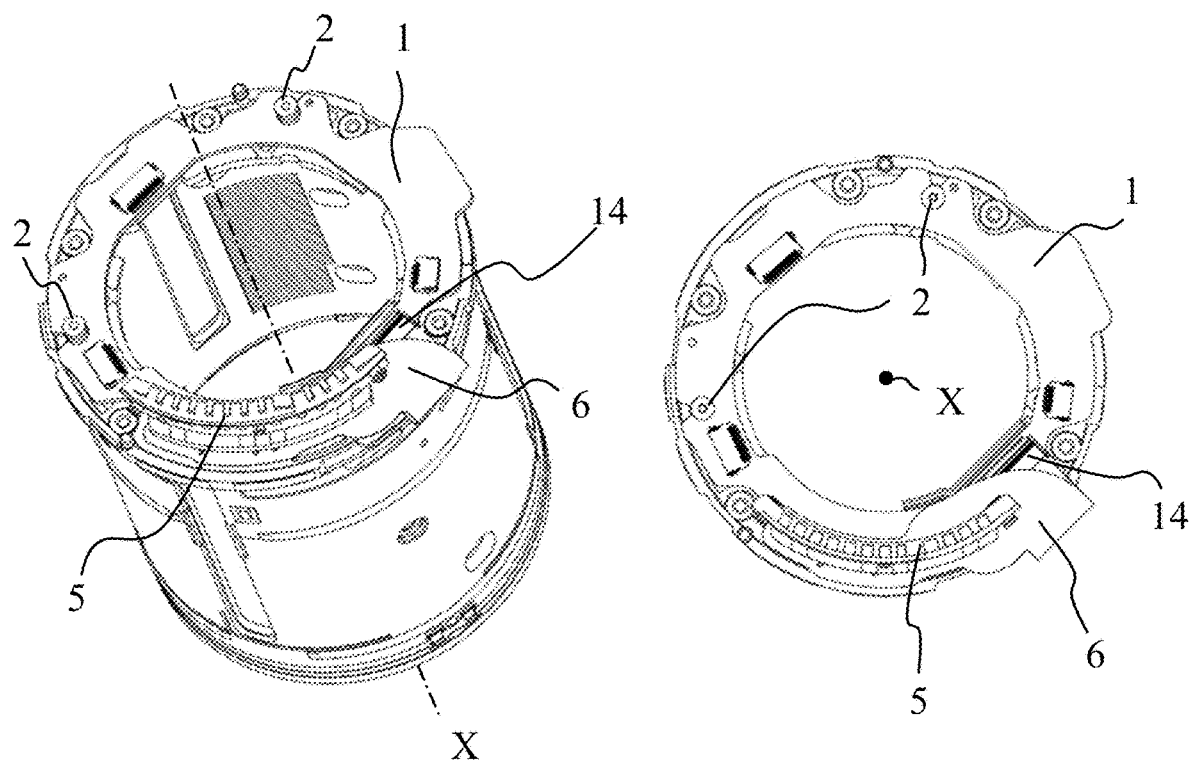
FIGS. 2A and 2B illustrate main components of the lens barrel.
Figure 3:
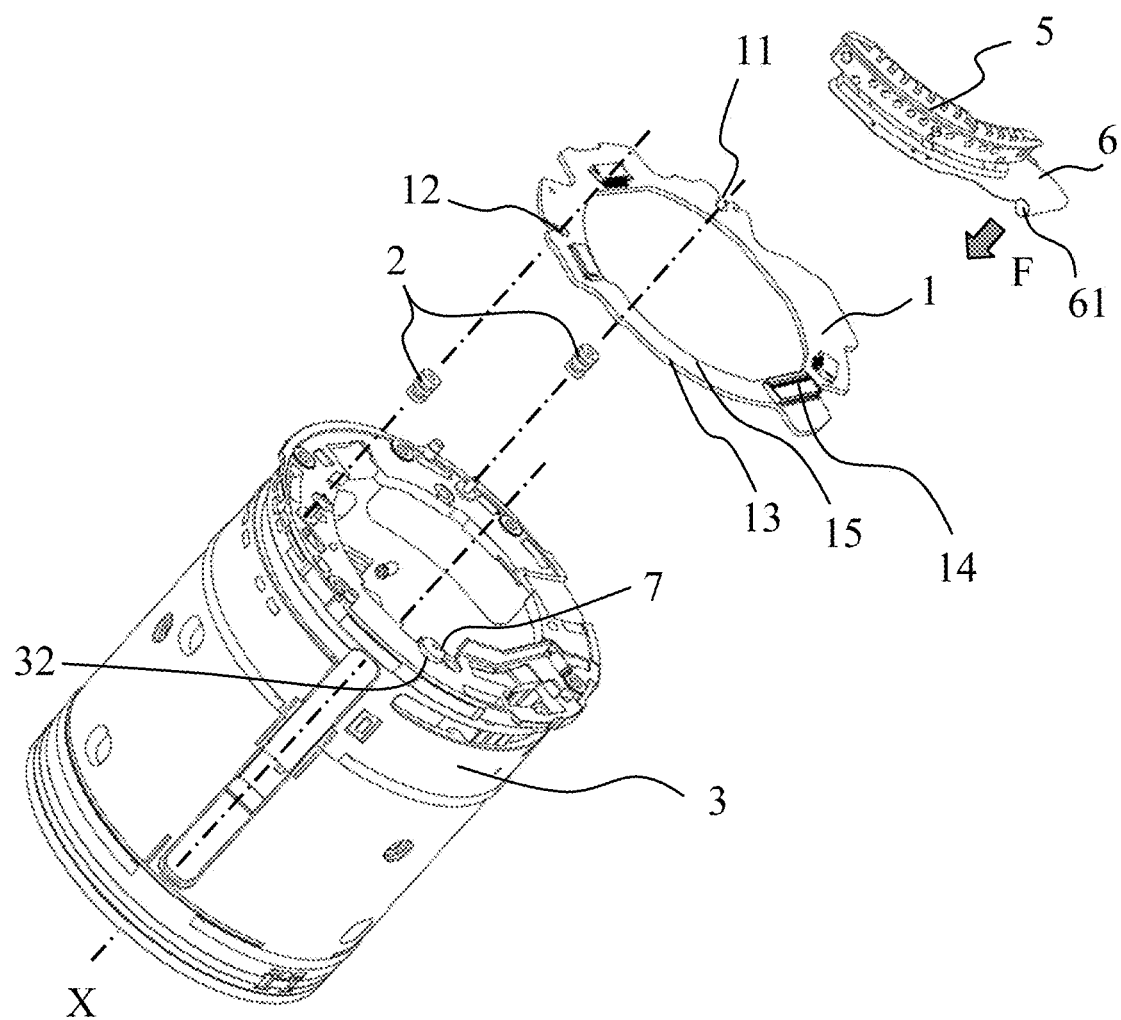
FIG. 3 is an exploded perspective view of the main components of the lens barrel.
Figure 4:
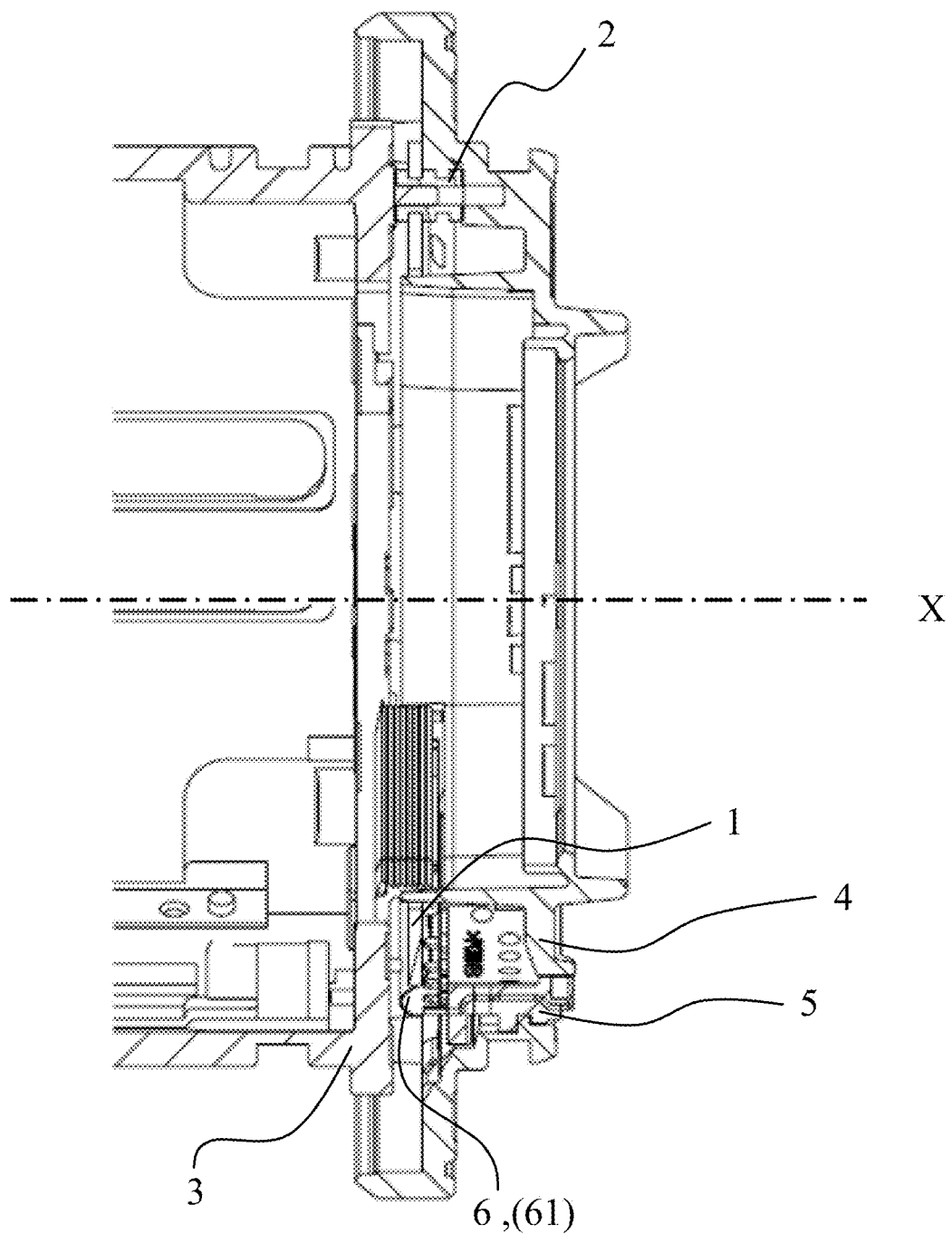
FIG. 4 is a sectional view of the main components of the lens barrel.
Figure 5:
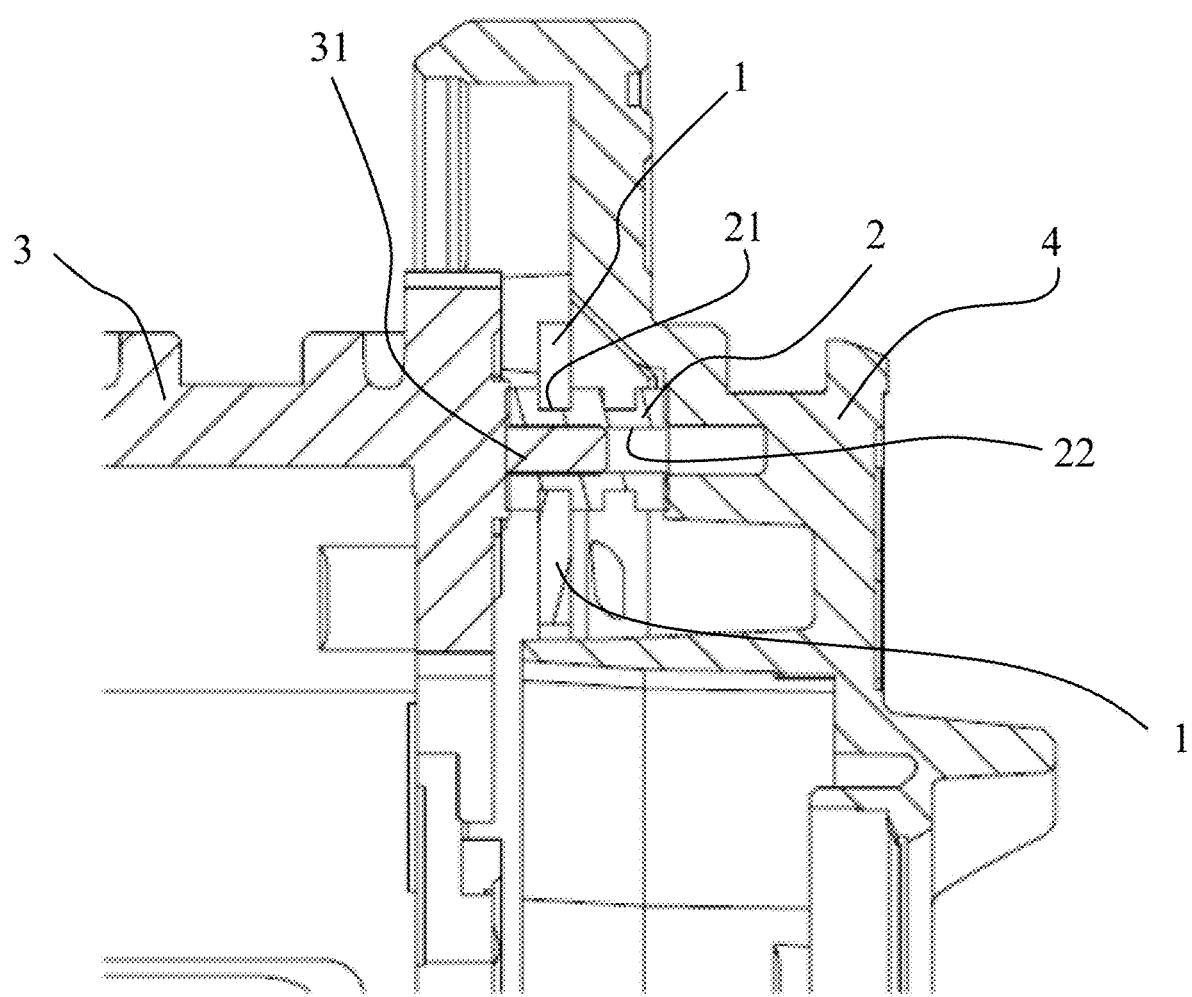
FIG. 5 is a partially enlarged view of FIG. 4.
Figure 6:
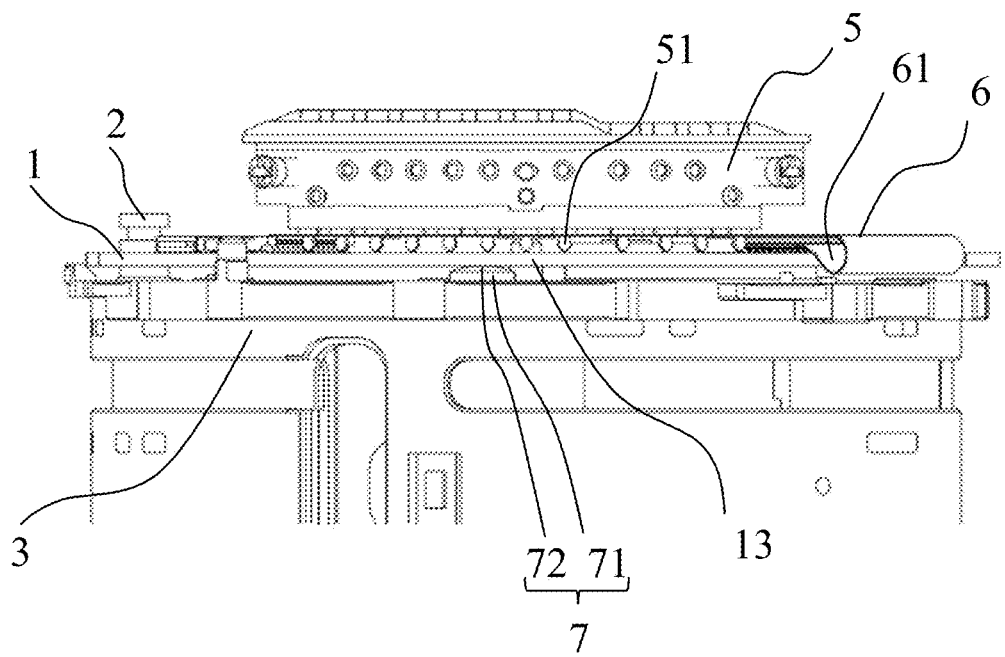
FIG. 6 is a side view of the main components of the lens barrel.
Figure 7:
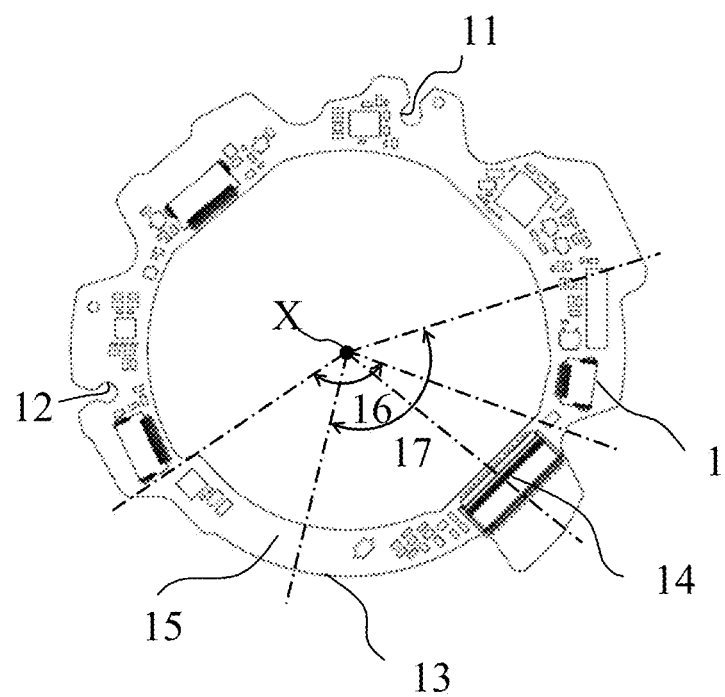
FIG. 7 illustrates an electric-component mounted board viewed from an imaging plane side.

FIGS. 2A and 2B illustrate main components of the lens barrel 100. FIG. 2A is a perspective view of the main components, and FIG. 2B illustrates the main components viewed from the imaging plane side. FIG. 3 is an exploded perspective view of the main components. FIG. 4 is a sectional view of the main components of the lens barrel 100. FIG. 5 is a partially enlarged view of FIG. 4, and illustrates a periphery of an elastic member 2. FIG. 6 is a side view of the main components of the lens barrel 100 viewed from a contact terminal block 5. FIG. 7 illustrates the electric-component mounted board 1 viewed from the imaging plane side.

The electric-component mounted board 1 is disposed between a fixed barrel 3 and a mount 4 in the optical axis direction of the lens barrel 100. The electric-component mounted board 1 has notches 11 and 12 in the outer periphery. An elastic member (first elastic member) 2 is inserted into each of the notches 11 and 12 in an elastically deformed state. The elastic member 2 is made of a material that is easily elastically deformable, such as silicon rubber.

The elastic member 2 has a plurality of constricted portions 21. Each constricted portion 21 is configured to sandwich the electric-component mounted board 1. The elastic member 2 has a hole 22 at the center. A protrusion 31 provided to the fixed barrel 3 is inserted into the hole 22. The electric-component mounted board 1 is thus positioned and held by the elastic member 2 in a direction orthogonal to the optical axis, and is fixed to the fixed barrel 3.

The mount 4 is attached to the fixed barrel 3 and compresses and holds (presses) the elastic member 2. The constricted portion 21 of the elastic member 2 serves as a retainer, and the electric-component mounted board 1 is held by the elastic members 2 while positioned in the optical axis direction. Thereby, the external shake such as the shutter shock shake generated when a shutter mechanism in the camera body is driven is absorbed by the elastic members 2 and is not transmitted to the shake detector mounted on the electric-component mounted board 1. Generally, the mount of the interchangeable lens has a function of connecting the interchangeable lens and the camera body, but the mount 4 according to this embodiment does not have to have such a function. For example, another part fixed to a general mount may be used such as a back cover for preventing the ghost and flare caused by harmful light reflected by a component near the mount.

The contact terminal block (electric contact) 5 is immovably fixed to the mount 4 by screws, adhesives, or the like, and is electrically connected to the electric-component mounted board 1 via a flexible printed circuit (FPC) board (second substrate) 6, and provides communication with the camera body and a power supply from the camera body.

A contact pin 51 provided to the contact terminal block 5 and the electric-component mounted board 1 do not overlap each other when viewed from the optical axis direction, but a distance between them in the direction orthogonal to the optical axis is very narrow. Since solder is piled up around the contact pin 51 by soldering to connect the contact pin 51 to the FPC board 6, the above interval becomes narrower by the volume of the piled solder. Thus, the solder around the contact pin 51 and the contact pin 51 may contact the electric-component mounted board 1. In order to avoid these contacts, it is necessary to sufficiently separate the electric-component mounted board 1 and the contact terminal block 5 in the optical axis direction, but the overall length of the lens barrel 100 is expanded in the optical axis direction.

Accordingly, in order to avoid these contacts, this embodiment provides a small diameter portion 13 having a diameter smaller than that of another portion to part of an outer circumference of the electric-component mounted board 1. The small diameter portion 13 occupies a range of about one-fourth of the electric-component mounted board 1 in the circumferential direction of the electric-component mounted board 1. Since the contact pin 51 can be located outside the small diameter portion 13, the contact terminal block 5 and the FPC board 6 overlap the electric-component mounted board 1 in the optical axis direction. Hence, the overall length of the lens barrel 100 can be shortened while the contact between the electric-component mounted board 1 and the contact terminal block 5 can be avoided.

This embodiment inserts the FPC board 6 into a connector 14 (connector between the electric-component mounted board 1 and the FPC board 6) provided on the electric-component mounted board 1, so that the electric-component mounted board 1 and the contact terminal block 5 are connected to each other. Using the connector 14 can makes small the electric-component mounted board 1, improve the assembly workability, and reduce the assembly cost. A narrow portion 15 having a narrow radial width is formed by providing the small diameter portion 13 on the electric-component mounted board 1. It is difficult to provide the connector 14 to the narrow portion 15 because the radial width of the narrow portion 15 is not enough for the connector 14 or its radial width is enough but is not enough for a wiring pattern for the connector 14. Accordingly, as illustrated in FIG. 3, this embodiment provides the connector 14 to an area adjacent to the small diameter portion 13 and having a sufficiently wide radial width.

It is unnecessary to use the connector 14 in connecting the FPC board 6 to the electric-component mounted board 1. For example, the FPC board 6 may be soldered to a land portion provided on the electric-component mounted board 1 and thereby connected to the electric-component mounted board 1.

Since the narrow portion 15 has such a narrow radial width that it is difficult to provide the narrow portion 15 with notches for fixing the elastic member 2 such as the notches 11 and 12. Although it is possible to provide a notch to an area bridged and connected to the outer circumferential side of the small diameter portion 13, the electric-component mounted board 1 spreads to the outer diameter side, increasing the size of the lens barrel 100.

The FPC board 6 has a first end connected to the electric-component mounted board 1 and a second end connected to the contact terminal block 5 while forming a folded portion 61. In this embodiment, the first end is inserted into the connector 14. The FPC board 6 is disposed so as to overlap the electric-component mounted board 1 when viewed from the optical axis direction. Although the folded portion 61 is formed in a U shape in this embodiment, the shape is not limited as long as it is bent. A straight line connecting the center of the folded portion 61 and the center of the optical axis is disposed within an angle range (first angle range) 17 of about ±60 degrees with respect to a straight line connecting the center of the connector 14 and the center of the optical axis illustrated in FIG. 7. The about ±60 degrees cover both exact ±60 degrees and substantial ±60 degrees that permit a difference by several degrees.

The elastic member 2 is longer than the electric-component mounted board 1 in the optical axis direction. If the elastic member 2 is disposed in an area overlapping or adjacent to the FPC board 6 when viewed from the optical axis direction, the FPC board 6 may be disconnected or the assembly workability may be deteriorated. Therefore, in this embodiment, the elastic member 2 cannot be disposed within a restricted angle range 16 of the electric-component mounted board 1 illustrated in FIG. 7. The restricted angle range 16 includes an area where the small diameter portion 13 and the FPC board 6 overlap each other when viewed from the optical axis direction and its neighboring area, and covers an angle range of about 140 degrees. The about 140 degrees covers both exact 140 degrees and substantial 140 degrees that permit a difference by several degrees. The electric-component mounted board 1 may be held and fixed at three locations at regular intervals of about 120 degrees. However, in this embodiment, the elastic member 2 cannot be disposed within the restricted angle range 16 or the electric-component mounted board 1 cannot be held by the three elastic members 2. It is thus difficult to stably hold the electric-component mounted board 1. If three elastic members 2 are disposed within an angle range of approximately 220 degrees outside the restricted angle range 16, they would be arranged at irregular intervals. Even if the elastic members 2 can be disposed at both ends of the restricted angle range 16, due to the angle range of 140 degrees in which the elastic members 2 cannot be placed, the electric-component mounted board 1 may be rotated and shaken around an axis as a straight line connecting the elastic members 2 at both ends. Therefore, the electric-component mounted board 1 is shaken by the external shake, and the image stabilizing performance deteriorates.

The contact terminal block 5 and the connector 14 are general-purpose components and their sizes are basically constant. If it is attempted to make small the electric-component mounted board 1 in order to make small the lens barrel 100, the angle range 16 becomes larger. As the restricted angle range 16 becomes larger, the electric-component mounted board 1 cannot be stably held, and the external shake cannot be suppressed.

Accordingly, this embodiment disposes an elastic member (second elastic member) 7 between the fixed barrel 3 and the electric-component mounted board 1 in the optical axis direction. The elastic member 7 is disposed within the angle range 17, is made of an elastic material such as silicon rubber, and includes a cylindrical shape 71 and a spherical shape 72 integrated with the cylindrical shape 71. The elastic member 7 is positioned and fixed by inserting the cylindrical shape 71 into a recess 32 in the fixed barrel 3. The spherical shape 72 protrudes from the fixed barrel 3 in the optical axis direction. The electric-component mounted board 1 contacts the tip of the spherical shape 72 on its surface on the fixed barrel 3 side.

Since the FPC board 6 is made of a flexible material such as polyimide, a force F (reaction force or restoring force) for unfolding the folded portion 61 illustrated in FIG. 3 is applied to the FPC board 6. The force F acts toward the fixed barrel 3 side (object side) in the optical axis direction as illustrated by an arrow direction in FIG. 3.

The electric-component mounted board 1 is urged toward the elastic member 7 by the force F and pressed against the tip of the spherical shape 72. Since the elastic member 7 is made of an elastically deformable material having surface friction such as silicon rubber, the electric-component mounted board 1 and the spherical shape 72 contact each other in an increased contact area with a predetermined frictional force. Thereby, the elastic member 7 functions as a third member for holding the electric-component mounted board 1. That is, the electric-component mounted board 1 is supported at three points by the two elastic members 2 and the elastic member 7, and thus it is stably held. This structure can suppress the transmission of the external shake to the shake detector.

In this embodiment, the FPC board 6 supplies the power for driving components (such as a zoom lens, a focus lens, an image stabilizing lens, and a diaphragm unit) inside the lens barrel 100. Therefore, the FPC board 6 has a plurality of patterns having a width, for example, of 0.3 mm or more. When a plurality of patterns having a large width are provided, the force F becomes so large that the electric-component mounted board 1 is sufficiently urged.

Figure 8A:
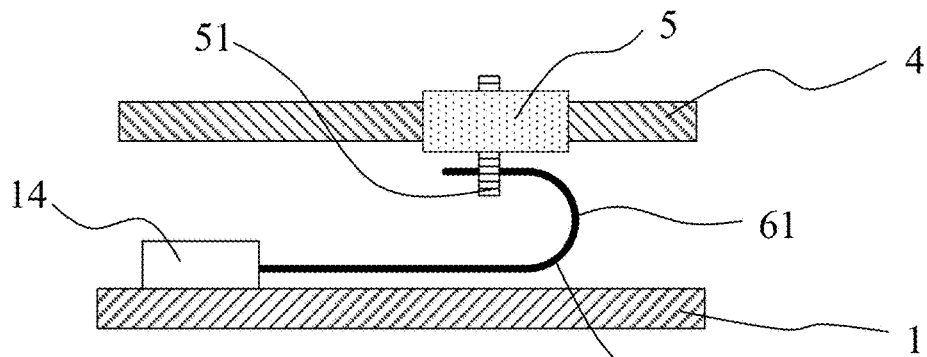
FIGS. 8A to 8D explain a folded portion of a flexible printed circuit (FPC) board.
Figure 8B:
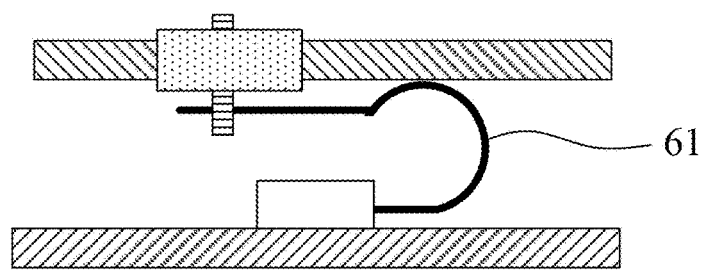
Figure 8C:
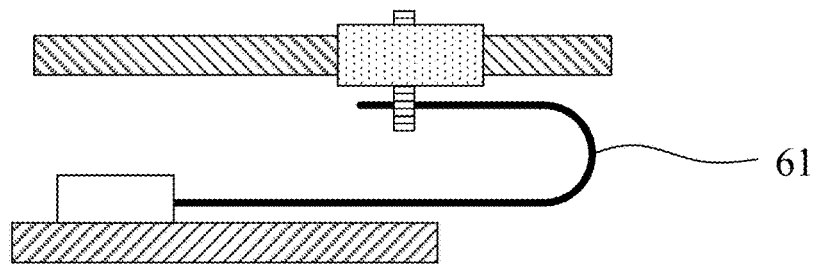

Referring now to FIGS. 8A to 8D, a description will be given of the folded portion 61. FIGS. 8A to 8D explain the folded portion 61, and illustrate a section of the folded portion 61 and surrounding components. In FIG. 8A, the folded portion 61 is formed between the contact terminal block 5 and the electric-component mounted board 1. The folded portion 61 overlaps the contact terminal block 5 when viewed from the optical axis direction. In FIG. 8B, the folded portion 61 is formed between the mount 4 and the electric-component mounted board 1. The folded portion 61 overlaps the mount 4 when viewed from the optical axis direction, but does not overlap the contact terminal block 5. In FIG. 8C, the folded portion 61 overlaps the mount 4 when viewed from the optical axis direction, but does not overlap the electric-component mounted board 1. In any of the cases illustrated in FIGS. 8A to 8C, the electric-component mounted board 1 is urged from the folded portion 61 toward the fixed barrel 3 by the force F. Therefore, the FPC board 6 may be connected to the electric-component mounted board 1 and the contact terminal block 5 while forming the folded portion 61 that can urge the electric-component mounted board 1 toward the fixed barrel 3 side.

Figure 8D:
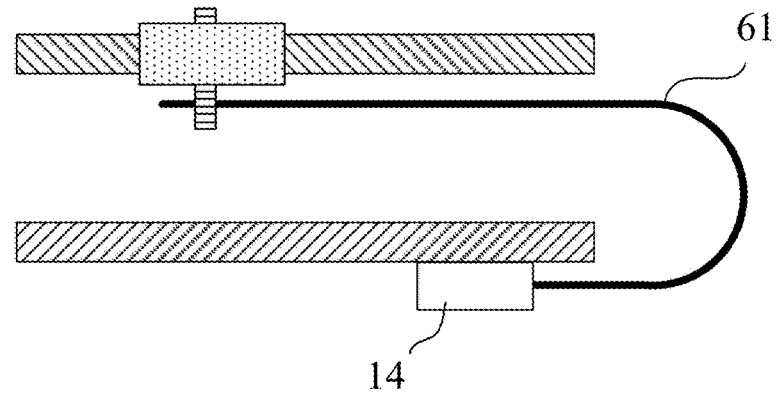

In this embodiment, the FPC board 6 is connected to the electric-component mounted board 1 on a surface opposite to a surface on the fixed barrel 3 side of the electric-component mounted board 1 (surface opposite to the mount 4 and the contact terminal block 5 of the electric-component mounted board 1), but the invention is not limited to this embodiment. As illustrated in FIG. 8D, the FPC board 6 may be connected to the electric-component mounted board 1 on the surface on the fixed barrel 3 side of the electric-component mounted board 1.

As described above, the configuration of this embodiment can provide the lens barrel 100 that has a high space use efficiency and can suppress the transmission of the shake to the shake detector.

The following description will discuss an application example/modification of this embodiment, an optimal example for a better effect, and the like.

In this embodiment, the connector 14 and the two elastic members 2 are arranged at intervals of approximately 120 degrees around the optical axis, but the present invention is not limited to this embodiment. The elastic members 2 may be arranged within an angle range (second angle range) of about 240 degrees outside the angle range 17. The about 240 degrees cover strict 240 degrees and substantial 240 degrees that permit a difference by several degrees.

In this embodiment, the folded portion 61 of the FPC board 6 has the highest effect of urging the electric-component mounted board 1, so that the positions (phases) of the connector 14 and the folded portion 61 around the optical axis are coincided with each other. However, the present invention is not limited to this embodiment. As long as the electric-component mounted board 1 can be urged toward the side of the fixed barrel 3, the positions (phases) of the connector 14 and the folded portion 61 around the optical axis may be different from each other.

The elastic member 7 is disposed in the restricted angle range 16 in this embodiment so as to overlap the FPC board 6 when viewed from the optical axis direction. In order to further suppress the transmission of the shake to the shake detector, (the center of) the elastic member 7 may be aligned with the position of (the center of) the folded portion 61 at the position (phase) around the optical axis (may overlap the (center of) the folded portion 61 when viewed from the optical axis direction).

The above embodiment can provide a lens barrel that has a high space efficiency and can suppress the transmission of the shake to the shake detector.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-038646, filed on Mar. 10, 2021, which is hereby incorporated by reference herein in its entirety.

What is claimed is:

1. A lens barrel comprising:
a fixed barrel;
a mount attached to the fixed barrel;
an electric contact fixed to the mount;
a first substrate disposed between the fixed barrel and the mount;
a second substrate connected to the first substrate and the electric contact while forming a folded portion, and disposed so as to overlap the first substrate when viewed from an optical axis direction;

a plurality of first elastic members held by the first substrate and configured to position and hold the first substrate in a direction orthogonal to an optical axis; and a second elastic member held by the fixed barrel and disposed between the fixed barrel and the first substrate, wherein the first substrate is urged toward the fixed barrel in the optical axis direction by a force from the folded portion, and contacts the second elastic member on a surface of the first substrate on a side facing the fixed barrel.

2. The lens barrel according to claim 1, wherein the second substrate is connected to the first substrate on a surface opposite to the surface of the first substrate on the side facing the fixed barrel.

3. The lens barrel according to claim 1, wherein the second substrate is connected to the first substrate on the surface of the first substrate on the side facing the fixed barrel.

4. The lens barrel according to claim 1, further comprising a gyro sensor or an acceleration sensor mounted on the first substrate.

5. The lens barrel according to claim 1, wherein the second substrate overlaps the second elastic member when viewed from the optical axis direction.

6. The lens barrel according to claim 1, wherein the folded portion overlaps the mount or the electric contact when viewed from the optical axis direction.

7. The lens barrel according to claim 1, wherein the second elastic member is disposed within a first angle range of ±60 degrees with respect to a straight line connecting a center of a connector between the first substrate and the second substrate and a center of the optical axis.

8. The lens barrel according to claim 1, wherein a straight line connecting a center of the folded portion and a center of the optical axis is located in a first angle range of ±60 degrees with respect to a straight line connecting a center of a connector between the first substrate and the second substrate and the center of the optical axis.

9. The lens barrel according to claim 7, wherein the plurality of first elastic members are disposed within a second angle range of 240 degrees outside the first angle range.

10. The lens barrel according to claim 1, wherein the first substrate contacts the second elastic member only on the surface of the first substrate on the side facing the fixed barrel.

* * * * *